(12) United States Patent
Hwang et al.

(10) Patent No.: US 6,262,884 B1
(45) Date of Patent: Jul. 17, 2001

(54) PORTABLE COMPUTER INHERENTLY CARRIED WITH OVERHEAD PROJECTION DEVICE

(76) Inventors: Wayne Hwang; Jim Hwang; Memiee Hwang; Richard Hwang, all of 2422 Southslope Way, West Linn, OR (US) 97068

( * ) Notice: Subject to any disclaimer, the term of this patent is extended or adjusted under 35 U.S.C. 154(b) by 0 days.

(21) Appl. No.: 09/498,762

(22) Filed: Feb. 2, 2000

(51) Int. Cl.⁷ ........................................................ G06F 1/16
(52) U.S. Cl. .......................... 361/681; 361/682; 345/905; 312/223.6
(58) Field of Search .................................... 361/681, 682; 248/917; 345/169, 905; 312/223.1–223.6, 223, 7.2; 353/119–120, 122

(56) References Cited

U.S. PATENT DOCUMENTS

| 6,049,450 | * | 4/2000 | Cho et al. | 361/683 |
| 6,108,195 | * | 8/2000 | Behl et al. | 361/681 |
| 6,191,939 | * | 2/2001 | Burnett | 361/681 |

* cited by examiner

*Primary Examiner*—Leo P. Picard
*Assistant Examiner*—Hung Van Duong

(57) ABSTRACT

A portable computer includes: a main body having keyboard formed thereon, a cover pivotally secured to the main body and operatively covering the main body, a liquid crystal display panel formed on the cover, a backlight cartridge having a backlight and a light diffusion plate normally positioned under the liquid crystal display panel for illuminating the liquid crystal display (LCD) panel for normally displaying the image on the LCD panel, a bottom projection cartridge alternatively substituting the backlight cartridge and positioned under the LCD panel when adapted for overhead projection purpose, a supporting device pivotally secured and normally folded on the cover (or on the main body) and operatively telescopically extended from the cover (or from the main body) to be uprightly erected on the cover (or the main body), and an overhead projection cartridge detachably mounted on the supporting device for projecting light towards the bottom projection cartridge, through which the light is then reflected and magnified upwardly through the LCD panel for projecting the image of the LCD panel upwardly to be magnified and reflected towards a screen through the overhead projection cartridge, thereby providing a compact combination of a portable computer with an overhead projection device for convenient handling and uses.

19 Claims, 7 Drawing Sheets

PORTABLE COMPUTER INHERENTLY CARRIED WITH OVERHEAD PROJECTION DEVICE

BACKGROUND OF THE INVENTION

U.S. Pat. No. 5,768,095 to Fusanobu Nakamura disclosed a portable computer having overhead projection capability. However, such a portable computer is adapted for use with an overhead projector, namely, the computer being absolutely separated from an overhead projector and requiring an additional overhead projector when intended for overhead projection purpose. It therefore has the following disadvantages:

1. An additional stand (20) and strap (40) should be provided for mounting the LCD display panel on an overhead projector as fastened by the strap (40) especially as shown in FIGS. 12A, 12B of the prior art (,095), causing inconvenience for overhead projection.
2. A heavy and big-volume overhead projector should be carried in addition to the portable computer, increasing handling complexity and inconvenience.
3. The detachment procedures for removing the rear cover (51) from the LCD display panel (52) secured on the lid (50) are quite complex and redundant when adapted for overhead projection use. Reversely, when it is intended for normal use as a portable computer, the "recovery" operations for re-assembling the rear cover (51) and the related components for "reconstruction" of the lid (50) are still complex and time-consuming.

The present inventor has found the drawbacks of the conventional art and invented the present portable computer having overhead projection device inherently carried thereon.

SUMMARY OF THE INVENTION

The object of the present invention is to provide a portable computer including: a main body having keyboard formed thereon, a cover pivotally secured to the main body and operatively covering the main body, a liquid crystal display panel formed on the cover, a backlight cartridge having a backlight and a light diffusion plate normally positioned under the liquid crystal display panel for illuminating the liquid crystal display (LCD) panel for normally displaying the image on the LCD panel, a bottom projection cartridge alternatively substituting the backlight cartridge and positioned under the LCD panel when adapted for overhead projection purpose, a supporting device pivotally secured and normally folded on the cover (or on the main body) and operatively telescopically extended from the cover (or from the main body) to be uprightly erected on the cover (or the main body), and an overhead projection cartridge detachably mounted on the supporting device for projecting light towards the bottom projection cartridge, through which the light is then reflected and magnified upwardly through the LCD panel for projecting the image of the LCD panel upwardly to be magnified and reflected towards a screen through the overhead projection cartridge, thereby providing a compact combination of a portable computer with an overhead projection device for convenient handling and uses.

DETAILED DESCRIPTION

Figure 13:
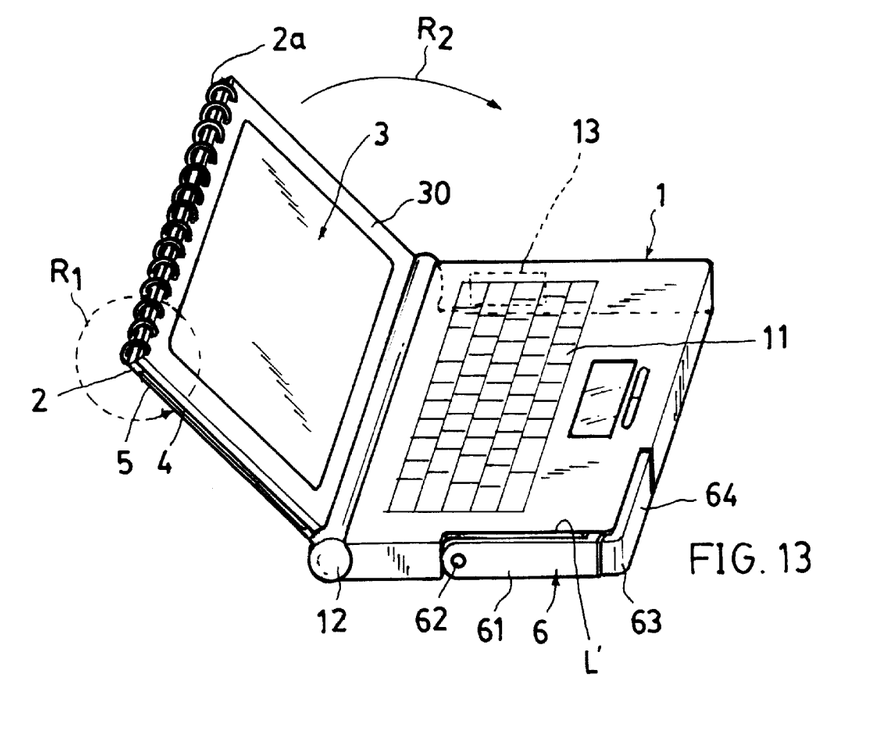
FIG. 13 is a perspective view of a further preferred embodiment of the present invention adapted for normal computer use.
Figure 14:
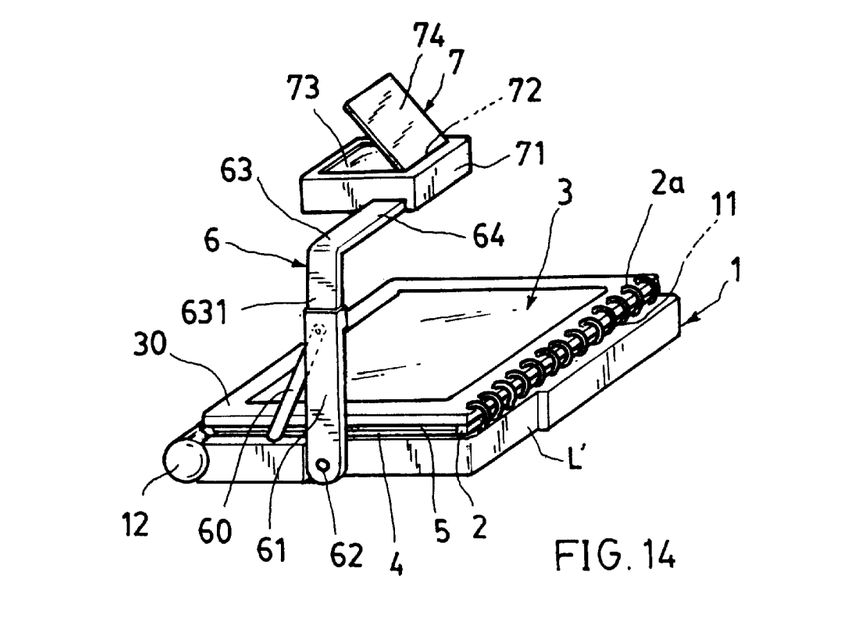
FIG. 14 is an illustration of the computer of that as shown in FIG. 13 when provided for overhead projection use.

As shown in FIGS. 1~5, a preferred embodiment of the present invention comprises: a main body 1, a cover 2 hingedly or pivotally secured to the main body 1, a liquid crystal display (LCD) panel 3 formed on the cover 2, a backlight cartridge 4 normally positioned under the LCD panel 3, a bottom projection cartridge 5 juxtapositioned to the backlight cartridge 4 and alternatively positioned under the LCD panel 3, a supporting means (or device) 6 pivotally, telescopically or detachably secured to the cover 2 (or secured to the main body 1 as shown in FIGS. 13, 14), and an overhead projection cartridge 7 detachably mounted on the supporting means 6.

The portable computer of the present invention may be referred to a portable personal computer, a notebook computer, a portable information processing apparatus, or any portable computer-related equipments having computer components, peripherals and LCD display panel formed thereon, not limited in this invention.

The LCD panel 3 may also be replaced with other display panels for showing image as transmitted or processed by the computer.

The main body 1 includes: a keyboard 11 formed thereon, a hinge 12 for hingedly or pivotally connecting the cover 2 to the main body 1, and a storing chamber 13 recessed in the main body 1 for storing the overhead projection cartridge 7 in the chamber 13 when detached from the supporting means 6 when not used for overhead projection.

The main body 1 is so conventional and not described in detail in this specification. The necessary CPU or other computer components and electronic circuits are also not described since they are conventional arts.

The cover 2 includes a frame 20 for securing the liquid crystal display panel 3 thereon, and a basement chamber 21 recessed in the cover 2 for storing therein the backlight cartridge 4 and the bottom projection cartridge 5 superimposed with each other. The LCD panel 3 secured to the frame 20 by bezels, brackets, holding frame or any other devices which are conventional and can be optionally selected for holding the LCD panel 3 on the cover 2 by those skilled in the art, not limited in the present invention.

The backlight cartridge 4 includes: a holding frame 41, a backlight 42 secured on the holding frame 41 for illuminating the LCD panel 3, and a light diffusion plate 43 secured within the holding frame 41 for homogeneously diffusing light emitted from the backlight 42 for illuminating the LCD panel 3.

A finger notch (or handle) 411 is formed in (on) an outer portion of the holding frame 41 of the backlight cartridge 4 to be held for withdrawing the backlight cartridge 4 outwardly from the basement chamber 21 of the cover 2 when the LCD panel 3 is served for overhead projection purpose, which will be described hereinafter.

At least a contacting switch 421 is formed on an inner edge portion of the holding frame 41 of the backlight cartridge 4 to be normally contacted with a power source circuit in the main body 1 for powering the backlight 42 through the on-off control of the contacting switch 421 for illuminating the LCD panel 3 when the portable computer is normally used for computer display use, rather than for OHP (overhead projection or overhead projector) use.

Figures 1, 4, 5:
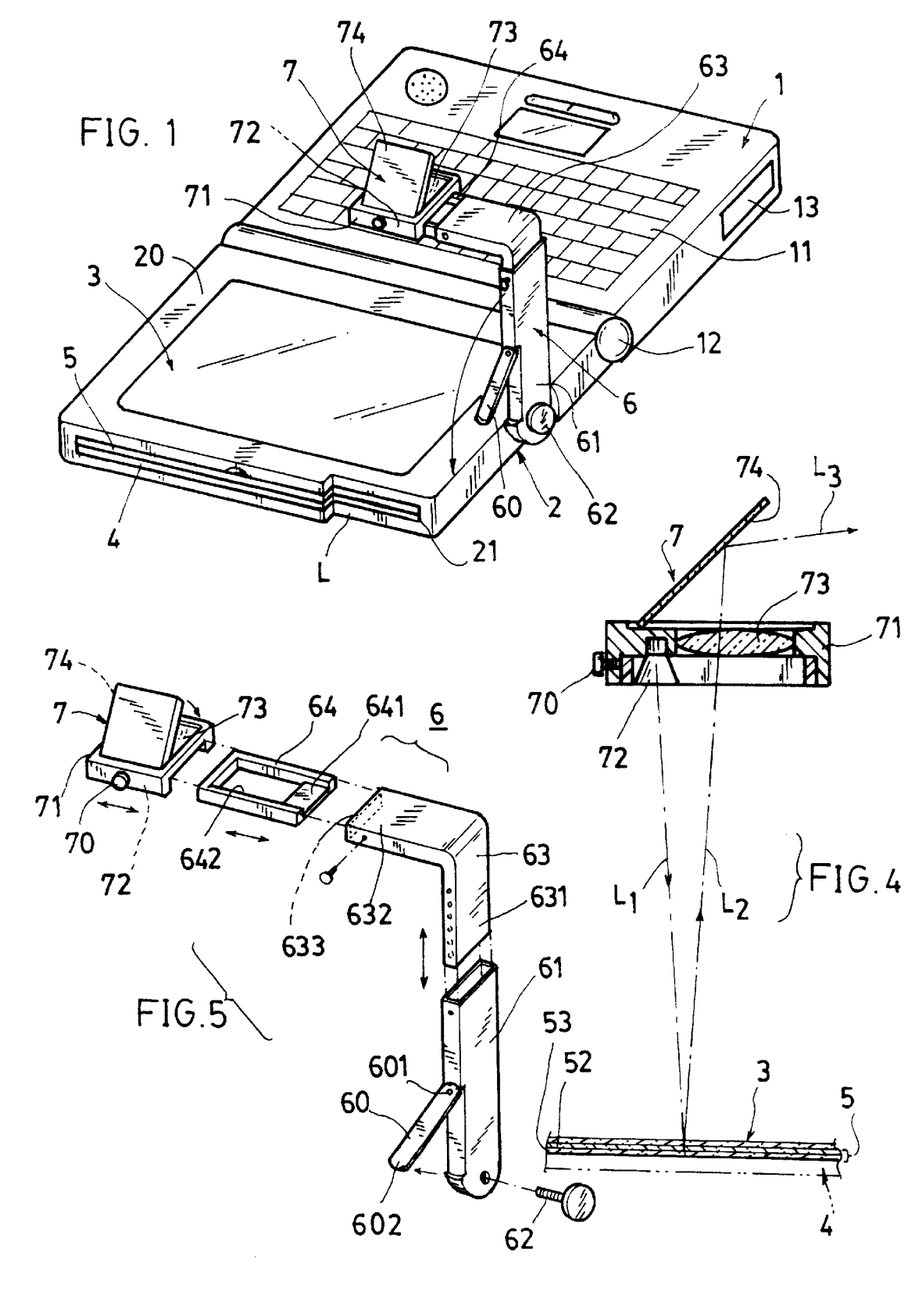
FIG. 1 is an illustration of the present invention.
FIG. 4 is a sectional drawing showing the light and image projection as effected by the present invention.
FIG. 5 is an exploded view of the supporting means of the present invention.

The bottom projection cartridge 5 includes: a binding frame 51 having an area or a dimension corresponding to that of the frame 41 of the backlight cartridge 4, an integration magnifying lens or Fresnel lens 52 superimposed on a reflecting mirror 53 both fastened in the binding frame 51. The integration magnifying lens (or Fresnel lens) 52 is provided for magnifying the light as downwardly projected (L1) from the overhead projection cartridge 7, when uprightly erected and positioned above the LCD panel 3 and the bottom projection cartridge 5 as shown in FIG. 4, and the light will then be upwardly reflected (L2) by the reflecting mirror 53 positioned under the integration magnifying lens 52.

A finger notch (or handle) 511 is also formed in (or on) an outer edge portion of the binding frame 51 of the bottom projection cartridge 5 for holding and withdrawing the cartridge 5 outwardly from the basement chamber 21 in the cover 2.

The basement chamber 21 is so designated because the chamber 21 is positioned under the LCD panel 3, like a "basement" (of a building) provided for storing the backlight cartridge 4 and the bottom projection cartridge 5 therein.

The binding frame 51 is so designated because the frame 51 is served for binding or fastening the upper integration lens 52 and the lower reflecting mirror 53 together within the frame 51.

The "cartridge" of the elements of backlight cartridge 4, bottom projection cartridge 5 and overhead projection cartridge 7 is defined in this specification in such a way because each cartridge (4, 5, 7) is independently served as a removable, replaceable module or cassette unit, being easily withdrawn, detached from the cover 2 or the main body 1; or being easily relocated or recovered into the cover 2 or the main body 1.

The integration magnifying lens 52 is a magnifying lens formed as a thin plate structure for better superimposing with the reflecting mirror 53.

Both the bottom projection cartridge 5 and the overhead projection cartridge 7 form as an overhead projector (OHP) for overhead projection use of the present invention. Even though the bottom projection cartridge 5 is mainly provided for upwardly reflecting (L2) the light from the downwardly emitting light (L1) from the overhead projection cartridge 7 (FIG. 4), the "projection" is still designated/incorporated in the term of said "bottom projection cartridge 5" to be logically compatible with the overhead projection cartridge 7 to synergetically form an overhead projection system in accordance with the present invention.

The supporting means 6 includes: a supporting leg 61 pivotally mounted on the cover 2 by a pivoting knob 62, which is loosened for rotating the supporting leg 61 to be pivotally uprightly erected above the cover 2 and then locked for stably erecting the leg 61 as shown in FIG. 1 for OHP use, an elbow member 63 telescopically mounted on the supporting leg 61, and a horizontal arm 64 telescopically horizontally held in the elbow member 63 for detachably securing the overhead projection cartridge 7 on the horizontal arm 64.

The supporting leg 61 further includes an auxiliary leg 60 pivotally secured to the supporting leg 61 and pivotally extended to be angularly supported on a supporting surface (as shown in FIG. 1) to help support the overhead projection cartridge 7.

Figure 1A:
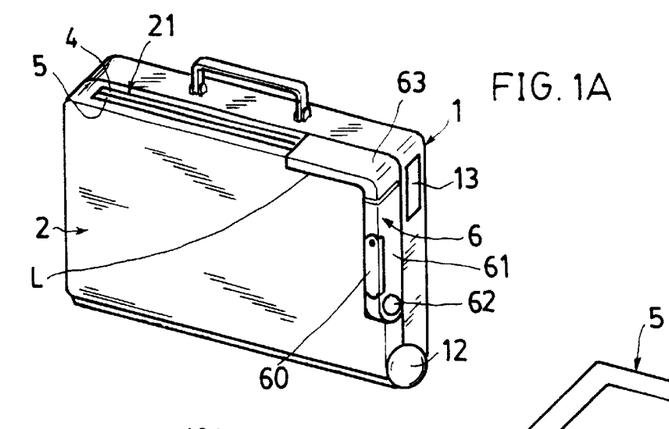
FIG. 1a shows the present invention when closed.
Figure 2:
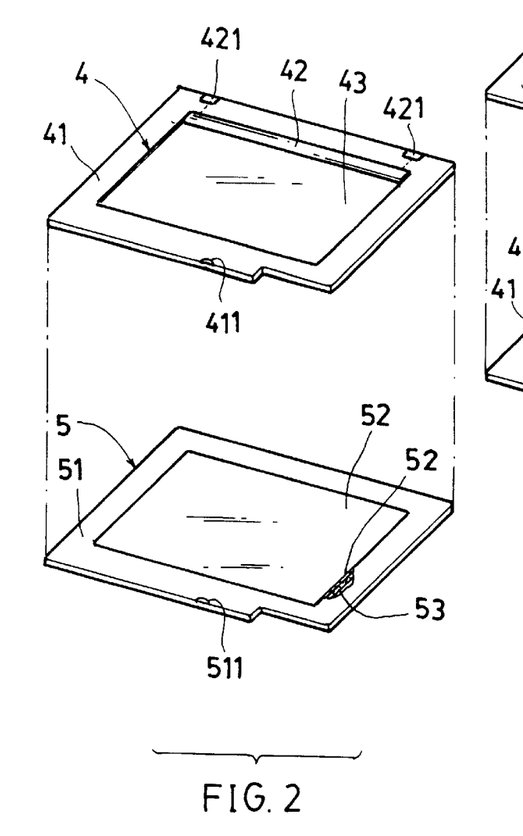
FIG. 2 is an exploded view of the backlight cartridge above the bottom projection cartridge of the present invention.
Figure 3:
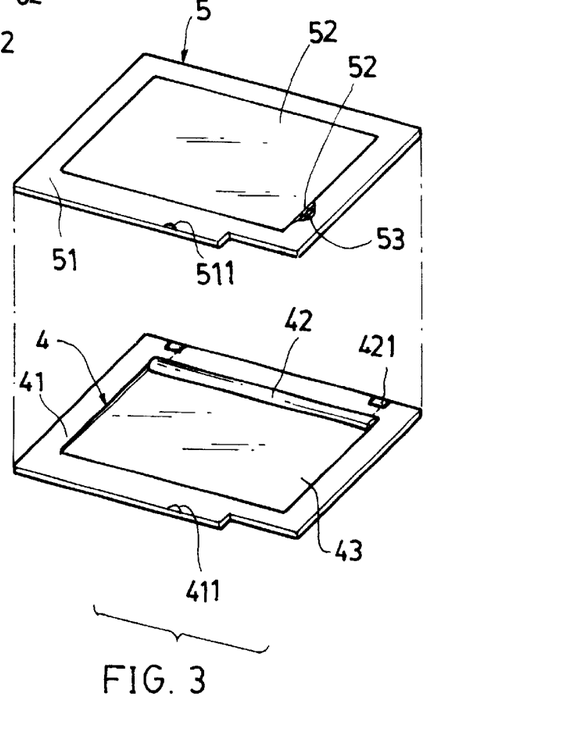
FIG. 3 is an exploded view of the bottom projection cartridge above the backlight cartridge of the present invention.

For closing the cover 2 on the main body 1 as shown in FIG. . IA, the supporting means 6 may be pivotally retracted into a L-shaped recess "L" formed in a corner of the cover 2. Other structures or designs for retracting the supporting means 6 when folded can be further modified and not described in detail and not limited in this invention.

The telescopic mechanism for telescopically engaging the elbow member 63 into the supporting leg 61 or for telescopically engaging the horizontal arm 64 within the elbow member 63 is a conventional mechanism, not limited in this invention.

The auxiliary leg 60 includes a pivot 601 for pivotally securing the auxiliary leg 60 to the supporting leg 61 and an anti-slipping pad 602 formed on a bottom end of the auxiliary leg 60 for frictionally holding the auxiliary leg 60 on the supporting surface.

The elbow member 63 includes: a vertical section 631 telescopically secured in the supporting leg 61 and a horizontal section 632 perpendicular to the vertical section 631 having a socket 633 recessed in the horizontal section 632 for telescopically securing the horizontal arm 64 in the socket 633.

The horizontal arm 64 includes: a holding base 641 slidably telescopically engaged in the socket 633 of the horizontal section 632 of the elbow member 63, and a bracket 642 for securing the overhead projection cartridge 7 thereon.

The overhead projection cartridge 7 includes: a casing 71 secured on the bracket 642 of the horizontal arm 64 of the supporting means 6 when uprightly erected, a projection lamp 72 secured in the casing 71 for projecting light (L1) downwardly to be reflected upwardly (L2) by the reflecting mirror 53 and magnified by the magnifying lens 52 superimposed on the reflecting mirror 53, an overhead magnifying lens 73 secured in the casing 71 for magnifying the image as projected through the LCD panel 3 positioned above the bottom projection cartridge 5 (FIG. 4), and a reflector 74 pivotally secured to the casing 71 for reflecting and projecting (L3) the image to be displayed on a screen (not shown).

The casing 71 further includes an adjusting knob 70 for fastening or locking the casing 71 of the overhead projection cartridge 7 on the horizontal arm 64 of the supporting means 6. The knob 70 may be operated for adjusting the horizontal position of the overhead projection cartridge 7 slidably held on the supporting means 6. Upon loosening of the knob 70, the casing 71 of the overhead projection cartridge 7 may be dismantled from the supporting means 6 and the cartridge 7 (in which the reflector 74 is pivotally folded onto the casing 71) will then be stored into the storing chamber 13 in the main body 1 for storage or handling of the portable computer of the present invention.

The elbow member 63 is telescopically mounted on the supporting leg 61 for adjusting the height thereof and for adjusting the height of the overhead projection cartridge 7 as mounted on the horizontal arm 64 of the supporting means 6.

The preferred embodiments of the present invention may be further modified without departing from the spirit and scope of the present invention.

For overhead projection purpose, the cover 2 is opened and flattened as shown in FIG. 1; with the supporting means 6 uprightly erected; with the overhead projection cartridge 7 mounted on the supporting means 6; and with the bottom projection cartridge 5 placed under the LCD panel 3 to substitute the backlight cartridge 4; whereby upon actuation of the present invention, the image on the LCD panel 3 will be projected towards a screen for a quicker overhead projection use. The backlight cartridge 4 is now superimposed under the bottom projection cartridge 5 when the present invention is provided for OHP use. Once the backlight 42 is removed from its normal (upper) position, the switch 421 of the backlight 42 will be switched off for disconnecting the power supply to the backlight 42 for saving energy therefore.

The present invention is superior to the prior arts with the following advantages:

1. The OHP device is inherently carried on the portable computer for instant OHP use without further preparing an overhead projector.
2. The OHP device can be quickly directly assembled in situ on the computer for a convenient use. Also, the OHP device can be fastly detached and stored into the portable computer, thereby simplifying the OHP assembly and detachment procedures for saving time.
3. Both the computer and OHP can be combined as a compact equipment for minimizing the volume thereof for convenient handling or storage.

For normal LCD display of the computer, the bottom projection cartridge 5 is alternatively superimposed under the backlight cartridge 4 to allow the backlight 42 directly illuminating the LCD panel 3 as usually done in a portable notebook computer.

Figure 6:
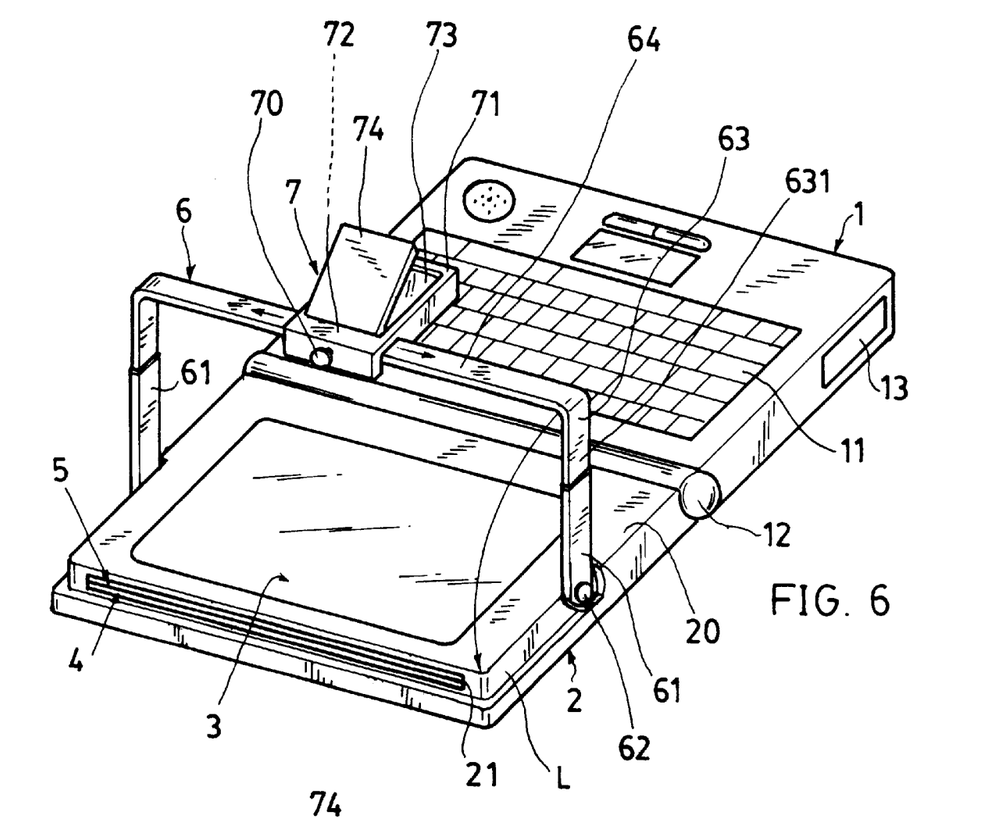
FIG. 6 shows another preferred embodiment of the present invention.
Figure 7:
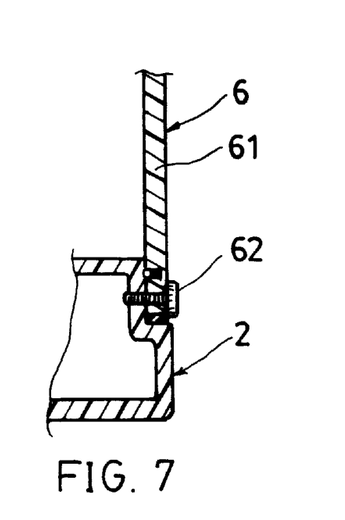
FIG. 7 is a partial sectional drawing of the supporting means on the cover of the present invention as shown in FIG. 6.
Figure 8:
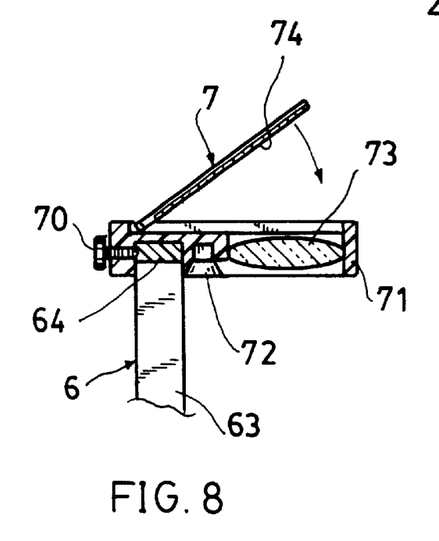
FIG. 8 shows a partial sectional drawing of the overhead projection cartridge of FIG. 6.

As shown in FIGS. 6~8, the present invention has been modified to modify the supporting means 7 to be an inversed U-shape structure, which includes: a pair of supporting legs 61 respectively pivotally mounted on opposite side portions of the cover by a pair of pivoting knobs 62, a horizontal arm 64 having a pair of elbow members 63 integrally formed on opposite ends of the horizontal arm 64, each elbow member 63 having a vertical section 631 thereof telescopically engageable with each supporting leg 61.

The overhead projection cartridge 7 is slidably mounted on the horizontal arm 64 of the supporting means 6 when uprightly erected above the cover 2 for OHP use. For storing the present invention, the overhead projection cartridge 7 is dismantled from the arm 64 and stored into the storing chamber 13 of the main body 1; and the U-shaped supporting means 6 is pivotally folded about the pivoting knobs 62 to be received into the recess L as recessed in the cover 2.

Figure 9:
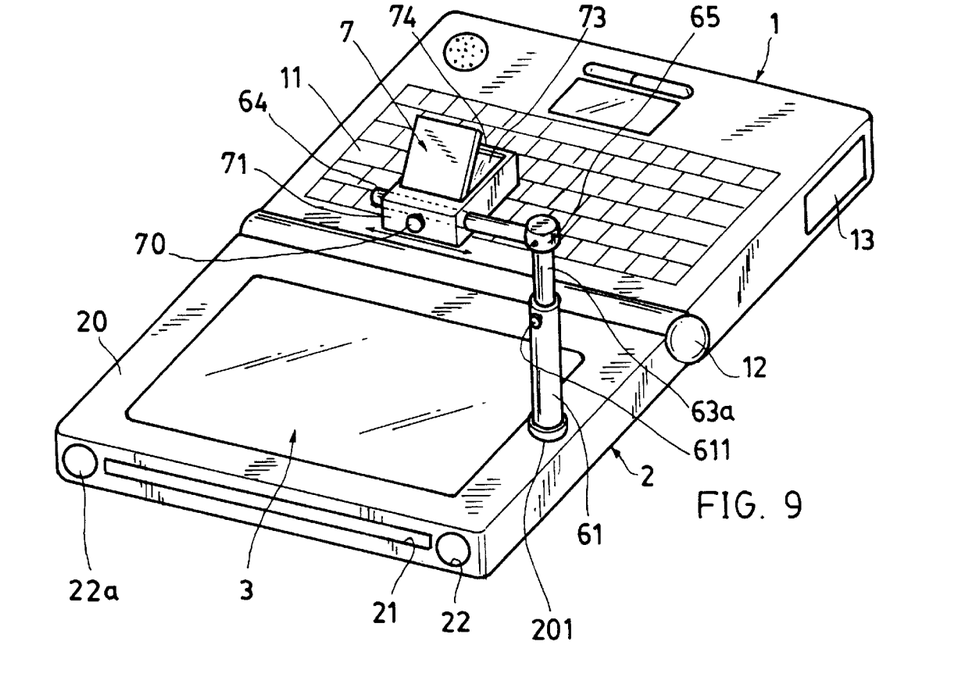
FIG. 9 shows still another preferred embodiment of the present invention.
Figure 10:
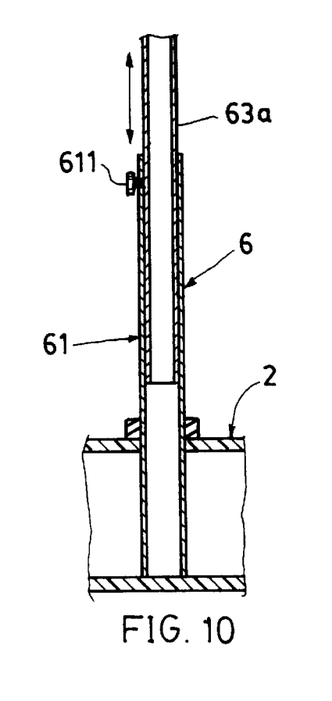
FIG. 10 is a partial sectional drawing of the supporting means on the cover of FIG. 9.
Figure 11:
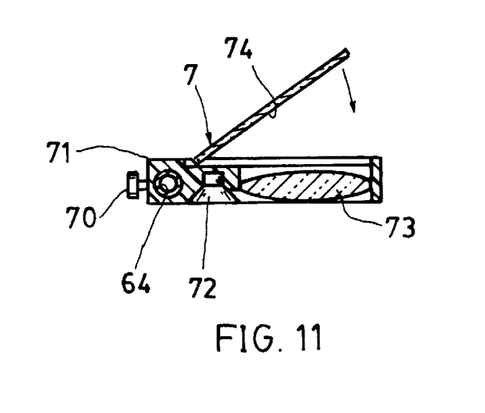
FIG. 11 is a partial sectional drawing of the overhead projection cartridge of FIG. 9.
Figure 12:
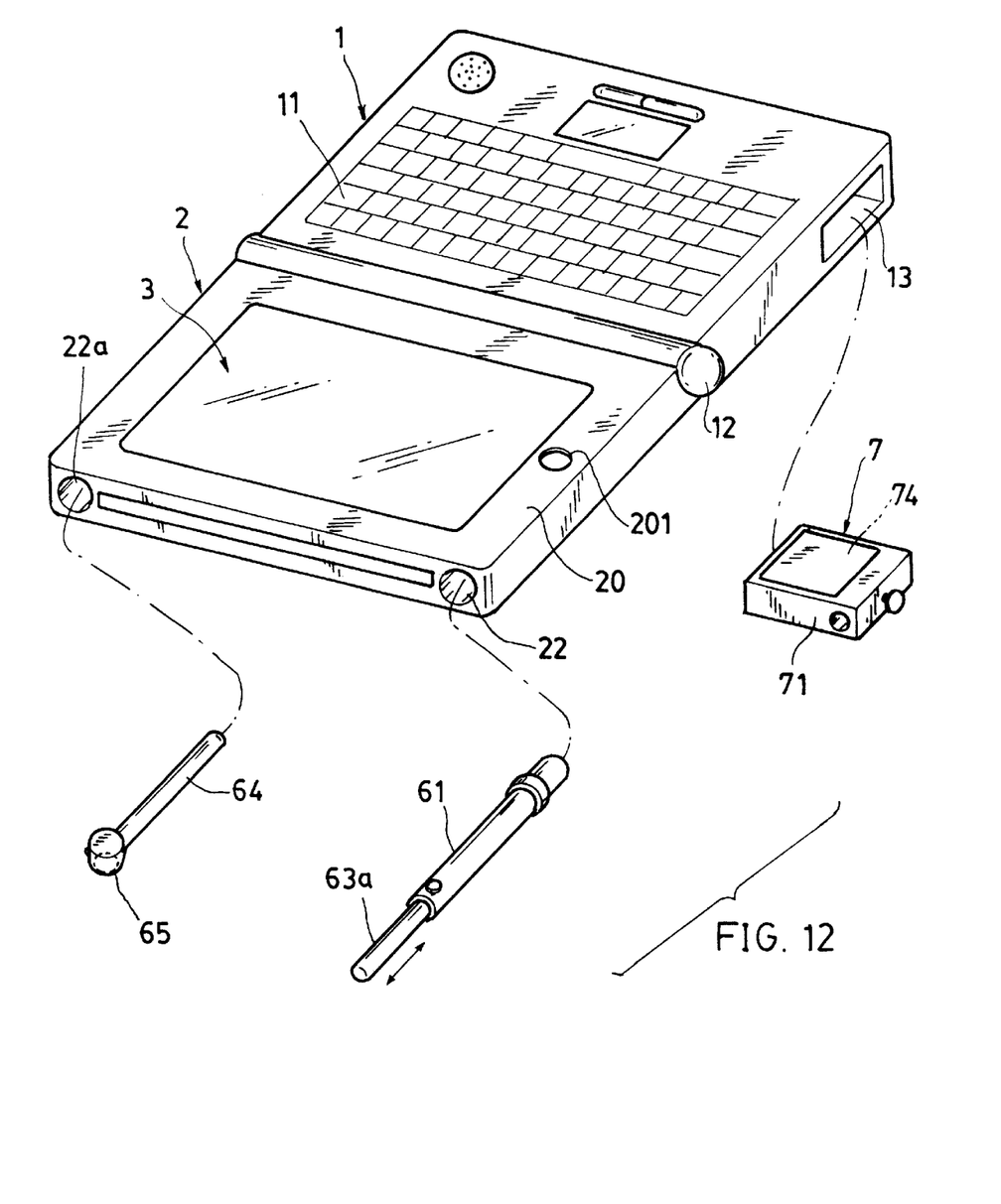
FIG. 12 is an illustration showing the storing of the supporting means and the overhead projection cartridge into the cover and the main body of FIG. 9.

As shown in FIGS. 9~12, the present invention is further modified in which the supporting means 6 includes: a supporting leg 61 normally received in an accessory recess 22 recessed in the cover 2 and uprightly erected in a leg hole 201 formed in the frame 20 of the cover 2 for OHP use as aforementioned as shown in FIG. 9, a horizontal arm 64 for horizontally securing the overhead projection cartridge 7 on the horizontal arm 64 having a connector 65 formed on an end portion of the horizontal arm 64 for connecting a vertical member 63a, with the vertical member 63a telescopically mounted on the supporting leg 61 and locked by an adjusting knob 611 formed on the leg 61; whereby when folding the cover 2 to close the main body 1, the OHP cartridge 7 is folded and removed from the arm 64 and stored into the chamber 13 in the main body 1, and the horizontal arm 64 with the connector 65 is dismantled from the vertical member 63a and stored into another accessory recess 22a recessed in the cover 2 as shown in FIG. 12.

As shown in FIGS. 13 and 14, the present invention is modified, in which the liquid crystal display (LCD) panel 3, which is secured in a LCD frame 30, is pivotally secured to the cover 2 by a portfolio hinge 2a formed on the cover 2 opposite to the hinge 12 pivotally connecting the cover 2 to the main body 1, a backlight cartridge 4 formed on a first side of the cover 2 proximal to the keyboard 11 of the main body 1 to be normally positioned under the liquid crystal display (LCD) panel 3, a bottom projection cartridge 5 formed on a second side of the cover 2 normally being opposite to the backlight cartridge 4 and distal from the keyboard 11 of the main body 1 for a normal display on the LCD panel 3 when opening the cover 2 from the main body 1 as shown in FIG. 13; and a supporting means 6 pivotally mounted on the main body 1 by a pivoting knob 62 having an auxiliary leg 60 for assistantly supporting the supporting leg 61 when uprightly erected above the main body 1 as shown in FIG. 14 for OHP purpose, and an overhead projection cartridge 7 mounted on the horizontal arm 64 of the supporting means 6 with an elbow member 63 provided with a vertical section 631 telescopically mounted on the supporting leg 61.

For OHP purpose, the LCD panel 3 is pivotally inverted (R1) about the hinge 2a to be overlapped on the bottom projection cartridge 5 from FIG. 13 to FIG. 14 and the cover 2 is pivotally closed (R2) on the main body 1 about the hinge 12 to position the LCD panel 3 above the bottom projection cartridge 5 for OHP use as aforementioned. The backlight cartridge 4 now becomes to be positioned under the bottom projection cartridge 5. The reflecting mirror 53 is, of course, positioned under the magnifying lens 52 of the bottom projection cartridge 5 when served for OHP use.

For folding the present invention, the overhead projection cartridge 7 is removed from the arm 64 to be stored in the chamber 13 in the main body 1, and the supporting means 6 is folded to be received in the recess L' formed in the main body 1 for a compact unit.

The power connection for transmitting control signals among the relevant elements of this invention can be built in the portfolio hinge 2a or by any other connection or communication methods, not limited in this invention.

Figure 15:
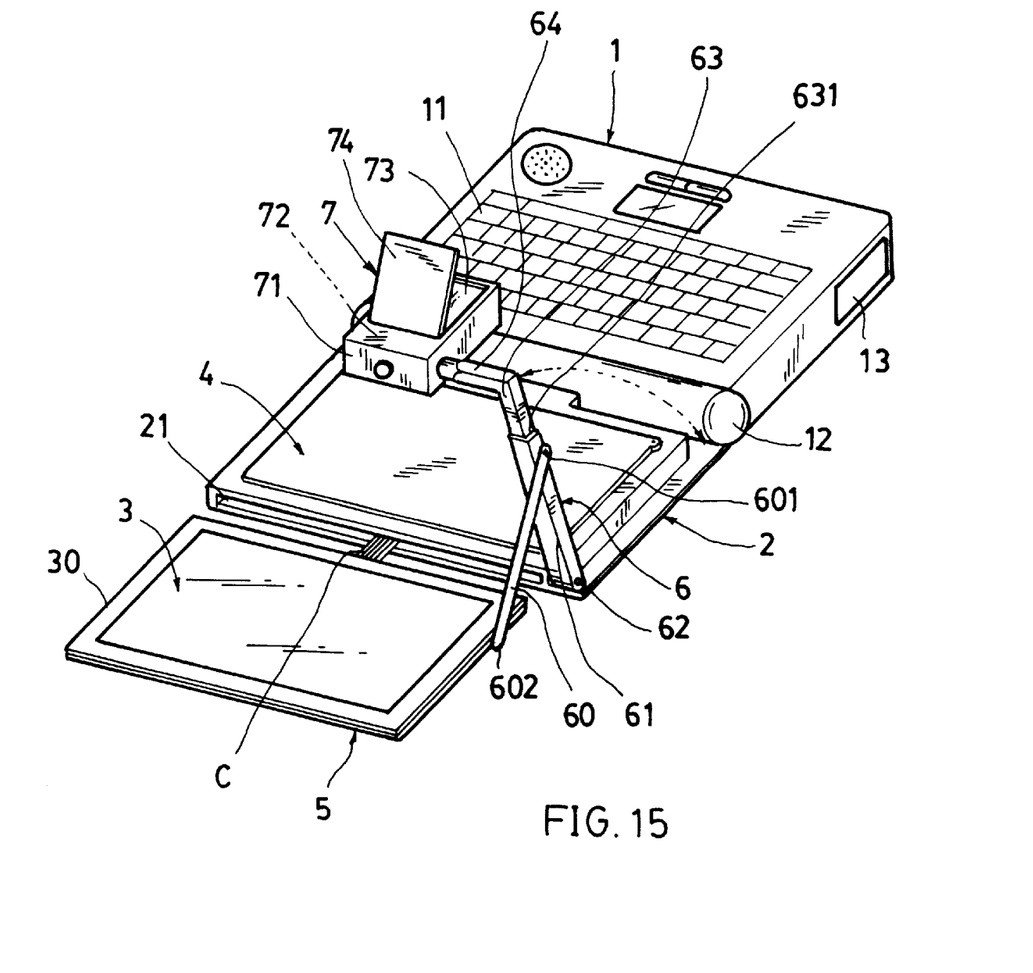
FIG. 15 shows still further preferred embodiment of the present invention.

As shown in FIG. 15, the LCD panel 3 is normally positioned above the backlight cartridge 4 which is secured to the cover 2 pivotally secured to the main body 1, and the bottom projection cartridge 5 is normally retracted and received in the basement chamber 21 formed in the cover 2 and operatively withdrawn outwardly from the basement chamber 21 having communication cable C connected between the bottom projection cartridge 5 with the central processing unit formed in the main body 1.

Upon opening of the cover 2 from the main body 1 and upright erection of the supporting means 6 on a supporting surface having the overhead projection cartridge 7 secured on the supporting means 6, the LCD panel 3 is dismantled from the cover 2 to be separated from the backlight cartridge 4 (and the LCD panel 3 is still electrically connected to the electronic circuit in the computer by cable C) and the LCD panel 3 is now superimposed above the bottom projection cartridge 5 as withdrawn from the chamber 21 of the cover 2 and the LCD panel 3 is projectively positioned under the OHP cartridge 7 for OHP purpose. The auxiliary leg 60 is angularly supported on the supporting surface for stably holding the OHP cartridge 7 for OHP use.

The present invention may be further modified without being limited to the examples as abovementioned. The portable computer may also be referred to any other portable information processing apparatus or portable computer-related equipments.

What is claimed is:

1. A portable computer inherently carried with overhead projection device comprising:

a main body having a keyboard formed thereon;

a cover pivotally secured to said main body for closing said main body for portable use;

a liquid crystal display (LCD) panel normally secured on said cover for normal display use for displaying image on said LCD panel by retrieving image signal from the portable computer;

a backlight cartridge stored in said cover and normally positioned under said LCD panel for illuminating said LCD panel for normal display use;

a bottom projection cartridge stored in said cover normally superimposed under said backlight cartridge when served for normal display use;

a supporting means foldably mounted in the portable computer and operatively uprightly erected above said cover when served for overhead projection use; and an overhead projection cartridge normally stored in the portable computer and detachably mounted on said supporting means for overhead projection use; whereby upon superimposition of said backlight cartridge under said bottom projection cartridge, and upon mounting of said overhead projection cartridge on said supporting means as uprightly erected for projection of light downwardly from said overhead projection cartridge to be upwardly reflected and magnified by said bottom projection cartridge towards said overhead projection cartridge, an image on said LCD panel will be magnified, reflected and projected towards a screen through said overhead projection cartridge positioned above said LCD panel and above said bottom projection cartridge; and upon removal of said overhead projection cartridge to be stored in the portable computer and upon folding of said supporting means to be received on the portable computer and closing said cover on said main body, a compact folded unit will be formed for portable purpose.

2. A portable computer according to claim 1, wherein said main body is formed with a storing chamber therein for storing said overhead projection cartridge in said storing chamber when dismantled from said supporting means.

3. A portable computer according to claim 1, wherein said cover is formed with a basement chamber therein for storing said backlight cartridge and said bottom projection cartridge in said basement chamber.

4. A portable computer according to claim 1, wherein the portable computer includes: a notebook computer, a portable information processing apparatus, and a portable computer-related equipment.

5. A portable computer according to claim 1, wherein said backlight cartridge includes: a holding frame, a backlight secured on the holding frame for illuminating the LCD panel, and a light diffusion plate secured within the holding frame for homogeneously diffusing light emitted from the backlight for illuminating the LCD panel.

6. A portable computer according to claim 1, wherein said bottom projection cartridge includes: a binding frame having a dimension corresponding to that of the frame of the backlight cartridge, a magnifying lens superimposed on a reflecting mirror and fastened in the binding frame, with said magnifying lens operatively magnifying a light as downwardly projected from the overhead projection cartridge, when said overhead projection cartridge uprightly erected and positioned above the LCD panel and the bottom projection cartridge, and said reflecting mirror positioned under the magnifying lens for reflecting said light upwardly towards said overhead projection cartridge.

7. A portable computer according to claim 1, wherein said supporting means includes: a supporting leg pivotally mounted on the cover by a pivoting knob, an elbow member telescopically mounted on the supporting leg, and a horizontal arm telescopically horizontally held in the elbow member for detachably securing the overhead projection cartridge on the horizontal arm.

8. A portable computer according to claim 1, wherein said overhead projection cartridge includes: a casing secured on a horizontal arm of the supporting means when uprightly erected, a projection lamp secured in the casing for projecting light downwardly to be reflected upwardly by a reflecting mirror and magnified by a magnifying lens superimposed on the reflecting mirror of said bottom projection cartridge, an overhead magnifying lens secured in the casing for magnifying the image as projected through the LCD panel positioned above the bottom projection cartridge, and a reflector pivotally secured to the casing for reflecting and projecting the image to be displayed on a screen.

9. A portable computer according to claim 1, wherein said supporting means is formed as an inversed-U shape, and includes: a horizontal arm integrally formed with a pair of elbow members on opposite ends of said horizontal arm, each said elbow member having a vertical section telescopically engageable with a supporting leg, with two said supporting legs respectively pivotally mounted on said cover.

10. A portable computer according to claim 1, wherein said supporting means includes: a supporting leg operatively erected on said cover and detachably mounted in a leg hole formed in said cover, a vertical member telescopically engageable with said supporting leg, and a horizontal arm perpendicularly secured to said vertical member for mounting said OHP cartridge thereon; said supporting leg, said vertical member and said horizontal arm respectively received in at least an accessory recess recessed in the portable computer when dismantled.

11. A portable computer according to claim 5, wherein said backlight cartridge includes at least a contacting switch formed on an inner edge portion of the holding frame of the backlight cartridge to be normally contacted with a power source circuit in the main body for powering the backlight through on-off control of the contacting switch for illuminating the LCD panel when the portable computer is used for normal display use.

12. A portable computer according to claim 6, wherein said magnifying lens is an integration magnifying lens formed as a thin plate for superimposing with the reflecting mirror.

13. A portable computer according to claim 7, wherein said supporting leg further includes an auxiliary leg pivotally secured to the supporting leg and pivotally extended to be angularity supported on a supporting surface to help support the overhead projection cartridge.

14. A portable computer according to claim 7, wherein said elbow member includes: a vertical section telescopically secured in the supporting leg and a horizontal section perpendicular to the vertical section having a socket recessed in the horizontal section for telescopically securing the horizontal arm in the socket.

15. A portable computer according to claim 8, wherein said casing further includes an adjusting knob for fastening the casing of the overhead projection cartridge on the horizontal arm of the supporting means for adjusting a horizontal position of the overhead projection cartridge slidably held on the supporting means.

16. A portable computer according to claim 13, wherein said auxiliary leg includes a pivot for pivotally securing the auxiliary leg to the supporting leg and an anti-slipping pad formed on a bottom end of the auxiliary leg for frictionally holding the auxiliary leg on the supporting surface.

17. A portable computer according to claim 14, wherein said horizontal arm includes: a holding base slidably telescopically engaged in the socket of the horizontal section of the elbow member, and a bracket for securing the overhead projection cartridge thereon.

18. A portable computer inherently carried with overhead projection device comprising:

a main body having a keyboard formed thereon;

a cover pivotally secured to said main body for closing said main body for portable use;

a liquid crystal display (LCD) panel pivotally secured to said cover by a portfolio hinge;

a backlight cartridge formed on a first side of said cover and proximal to the main body and normally positioned under said LCD panel for illuminating said LCD panel for normal display use;

a bottom projection cartridge formed on a second side of said cover normally being opposite to said backlight cartridge and distal from said main body, said bottom projection cartridge normally stored in said cover and superimposed under said backlight cartridge when served for normal display use;

a supporting means foldably mounted in the portable computer and operatively uprightly erected above said computer when served for overhead projection use; and an overhead projection cartridge normally stored in the portable computer and detachably mounted on said supporting means for overhead projection use; whereby upon a pivotal inversion of said LCD panel about said portfolio hinge to be superimposed on said bottom projection cartridge and upon folding of said cover to be closed on said main body, and upon upright erection of said OHP cartridge above said LCD panel and said bottom projection cartridge, said computer is provided for overhead projection use.

19. A portable computer inherently carried with overhead projection device comprising:

a main body having a keyboard formed thereon;

a cover pivotally secured to said main body for closing said main body for portable use;

a liquid crystal display (LCD) panel normally secured on said cover for normal display use for displaying image thereon;

a backlight cartridge secured in said cover and normally positioned under said LCD panel for illuminating said LCD panel for normal display use;

a bottom projection cartridge normally stored in said cover when served for normal display use, and operatively withdrawn outwardly from said cover; said LCD panel detachably superimposed on said bottom projection cartridge when provided for overhead projection use;

a supporting means foldably mounted in the portable computer and operatively uprightly erected when served for overhead projection use; and an overhead projection cartridge normally stored in the portable computer and detachably mounted on said supporting means for overhead projection use; whereby upon positioning of said overhead projection cartridge above said LCD panel and above said bottom projection cartridge, said computer is provided for overhead projection use.

* * * * *